(12) United States Patent
Yu et al.

(10) Patent No.: US 10,736,136 B2
(45) Date of Patent: Aug. 4, 2020

(54) INTERLACE DETERMINATION FOR A DEVICE

(71) Applicant: Lenovo Innovations Limited (Hong Kong), Hong Kong (CN)

(72) Inventors: Xiaodong Yu, Beijing (CN); Haipeng Lei, Beijing (CN); Zukang Shen, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 118 days.

(21) Appl. No.: 16/145,988

(22) Filed: Sep. 28, 2018

(65) Prior Publication Data

US 2019/0037593 A1    Jan. 31, 2019

Related U.S. Application Data

(63) Continuation of application No. PCT/CN2016/078213, filed on Mar. 31, 2016.

(51) Int. Cl.
| | |
|---|---|
| *H04W 72/14* | (2009.01) |
| *H04L 5/00* | (2006.01) |
| *H04W 72/04* | (2009.01) |
| *H04W 72/12* | (2009.01) |

(52) U.S. Cl.
CPC .......... *H04W 72/14* (2013.01); *H04L 5/0037* (2013.01); *H04L 5/0044* (2013.01); *H04L 5/0092* (2013.01); *H04W 72/042* (2013.01); *H04W 72/1284* (2013.01)

(58) Field of Classification Search
CPC ............... H04W 72/042; H04W 72/14; H04W 72/1284; H04L 5/0037; H04L 5/0044; H04L 5/0092
See application file for complete search history.

(56) References Cited

U.S. PATENT DOCUMENTS

| | | | | |
|---|---|---|---|---|
| 9,854,569 | B2* | 12/2017 | Yang | ........ H04L 5/0053 |
| 2010/0220683 | A1* | 9/2010 | Novak | ......... H04W 72/12 |
| | | | | 370/330 |
| 2010/0329374 | A1 | 12/2010 | Pi | |

(Continued)

FOREIGN PATENT DOCUMENTS

| | | | |
|---|---|---|---|
| WO | 2007/014359 A2 | 2/2007 | |
| WO | WO-2007014359 A2 * | 2/2007 | ............. H04L 69/32 |
| WO | 2016/019243 A1 | 2/2016 | |

OTHER PUBLICATIONS

PCT/CN2016/078213 International Search Report and Written Opinion, dated Dec. 26, 2016, pp. 1-11.

*Primary Examiner* — Afsar M Qureshi

(74) *Attorney, Agent, or Firm* — Kunzler Bean & Adamson

(57) ABSTRACT

Apparatuses, methods, and systems are disclosed for interlace determination. One apparatus includes a processor that determines a system bandwidth including multiple interlaces. Each interlace of the multiple interlaces includes a set of physical resource blocks ("PRBs") that are uniformly spaced in frequency. The processor also determines a first set of interlaces of the multiple interlaces for a first device. The first set of interlaces includes one or more interlaces. The apparatus includes a transmitter that transmits a first signal to the first device. The first signal indicates the first set of interlaces, and a number of bits of the first signal is less than a number of interlaces of the multiple interlaces.

42 Claims, 8 Drawing Sheets

(56) References Cited

U.S. PATENT DOCUMENTS

| | | | |
|---|---|---|---|
| 2012/0120924 A1* | 5/2012 | Montojo | H04W 48/12 |
| | | | 370/336 |
| 2015/0016323 A1 | 1/2015 | Sundararajan et al. | |
| 2015/0085794 A1* | 3/2015 | Chen | H04W 72/042 |
| | | | 370/329 |
| 2016/0037352 A1* | 2/2016 | Wei | H04W 74/0833 |
| | | | 455/454 |
| 2016/0183257 A1* | 6/2016 | Vrzic | H04W 72/0413 |
| | | | 370/329 |
| 2017/0164352 A1 | 6/2017 | Yang et al. | |

* cited by examiner

INTERLACE DETERMINATION FOR A DEVICE

FIELD

The subject matter disclosed herein relates generally to wireless communications and more particularly relates to interlace determination for a device in a wireless communication system.

BACKGROUND

The following abbreviations are herewith defined, at least some of which are referred to within the following description.

3GPP Third Generation Partnership Project
ACK Positive-Acknowledgment
ANDSF Access Network Discovery and Selection Function
AP Access Point
APN Access Point Name
AS Access Stratum
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CRS Cell-Specific Reference Signal
CSS Common Search Space
DCI Downlink Control Information
DL Downlink
DFT Discrete Fourier Transform
DMRS Demodulation Reference Signal
EDGE Enhanced Data Rates for Global Evolution
eNB Evolved Node B
EPDCCH Enhanced Physical Downlink Control Channel
E-RAB E-UTRAN Radio Access Bearer
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GERAN GSM/EDGE Radio Access Network
GPRS General Packet Radio Service
GSM Global System for Mobile Communication
GTP GPRS Tunneling Protocol
HARQ Hybrid Automatic Repeat Request
H-PLMN Home Public Land Mobile Network
IFDMA Interleaved Frequency Division Multiple Access
IoT Internet-of-Things
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
NB-IoT NarrowBand Internet of Things
OFDM Orthogonal Frequency Division Multiplexing
PCell Primary Cell
PBCH Physical Broadcast Channel
PCID Physical Cell Identification ("ID")
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PSD Power Spectrum Density
PSS Primary Synchronization Signal
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RE Resource Element
RRC Radio Resource Control
RS Reference Signal
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
SSS Secondary Synchronization Signal
TAU Tracking Area Update
TBS Transport Block Size
TCP Transmission Control Protocol
TDD Time-Division Duplex
TDM Time Division Multiplex
TED Tunnel Endpoint Identification ("ID")
TTI Transmit Time Interval
TX Transmit
UCI Uplink Control Information
UE User Entity/Equipment (Mobile Terminal)
UL Uplink
UMTS Universal Mobile Telecommunications System
V-PLMN Visited Public Land Mobile Network
WiMAX Worldwide Interoperability for Microwave Access
WLAN Wireless Local Area Network In wireless communications networks, a frame structure for LTE FDD may be used. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{UL} N_{sc}^{RB}$ subcarriers and $N_{symb}^{UL}$ OFDM symbols, where $N_{RB}^{UL}$ is a number of RBs in the UL (which is dependent on the transmission bandwidth of a cell); $N_{sc}^{RB}$ is the number of subcarriers in each RB; and each subcarrier occupies a certain frequency of size Δf. The values of $N_{sc}^{RB}$, Δf, and $N_{symb}^{UL}$ may depend on a cyclic prefix as shown in Table 1.

TABLE 1

| Configuration | | $N_{sc}^{RB}$ | $N_{symb}^{UL}$ |
|---|---|---|---|
| Normal Cyclic Prefix | Δf = 15 kHz | 12 | 7 |
| Extended Cyclic Prefix | Δf = 15 kHz | | 6 |
| | Δf = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain wireless communication networks, an unlicensed spectrum may include operational requirements, such as an occupied bandwidth requirement, and a power spectrum density ("PSD") requirement. In one wireless communication network, a nominal channel bandwidth is the widest band of frequencies (including guard bands) assigned to a single channel. In certain networks, the nominal channel bandwidth should be at least 5 MHz. In various networks, an occupied channel bandwidth (e.g., the bandwidth containing 99% of the power of the signal) should be between 80% and 100% of the nominal channel bandwidth. In some networks, a maximum PSD is 10 dBm/MHz in ETSI with a resolution bandwidth of 1 MHz. Such a maximum PSD implies that a signal which occupies a small portion of the bandwidth may not be transmitted at the maximum available power at a UE due to the PSD and occupied bandwidth constraints. Such operational requirements may be difficult to accommodate and/or may occupy excessive signaling overhead.

BRIEF SUMMARY

Apparatuses for interlace determination are disclosed. Methods and systems also perform the functions of the apparatus. In one embodiment, the apparatus includes a processor that determines a system bandwidth including multiple interlaces. Each interlace of the multiple interlaces includes a set of physical resource blocks ("PRBs") that are uniformly spaced in frequency, and, in some embodiments, each interlace of the multiple interlaces has a frequency span that exceeds a predetermined percent of the system bandwidth. The processor also determines a first set of interlaces of the multiple interlaces for a first device. The first set of interlaces includes one or more interlaces. In certain embodiments, the apparatus includes a transmitter that transmits a first signal to the first device. The first signal indicates the first set of interlaces, and a number of bits of the first signal is less than a number of interlaces of the multiple interlaces. In some embodiments, the apparatus includes a receiver that receives data from the first device on the first set of interlaces.

In certain embodiments, the processor determines a second set of interlaces of the multiple interlaces for a second device. In such embodiments, the second set of interlaces includes one or more interlaces, the first and second sets of interlaces are mutually exclusive, and the first and second sets of interlaces include each interlace in the multiple interlaces; the transmitter transmits a second signal to the second device, the second signal indicating the second set of interlaces; and the receiver receives data from the second device on the second set of interlaces. In some embodiments, the predetermined percent is 80 percent. In one embodiment, each interlace of the multiple interlaces includes a number of PRBs selected from the group including 8, 10, and 12. In various embodiments, the first set of interlaces includes at least two interlaces and PRBs in the first set of interlaces are uniformly spaced in frequency. In some embodiments, the first set of interlaces includes at least two interlaces and the at least two interlaces are consecutive in frequency. In certain embodiments, the first set of interlaces includes N interlaces, N is greater than one, the first set of interlaces includes a first subset of interlaces and a second subset of interlaces, the first subset of interlaces includes $$\lceil \frac{N}{2} \rceil$$

interlaces, the second subset of interlaces includes $$\left( \lceil \frac{N}{2} \rceil - 1 \right)$$

interlaces, interlaces of the first subset of interlaces are consecutive in frequency, and interlaces of the second subset of interlaces are consecutive in frequency.

In some embodiments, the transmitter transmits a third signal to the first device, and the third signal indicates one or more of the number of interlaces in the multiple interlaces and a number of PRBs in each interlace of the multiple interlaces. In certain embodiments, the processor determines one or more PRBs not included in the multiple interlaces; the transmitter transmits a fourth signal to the first device, wherein the fourth signal indicates whether the one or more PRBs are assigned for data transmission; and the receiver receives data from the first device on the one or more PRBs. In various embodiments, the processor determines one or more PRBs not included in the multiple interlaces; and the receiver receives data from the first device on the one or more PRBs if the first set of interlaces includes a predetermined interlace. In some embodiments, the processor determines one or more PRBs not included in the multiple interlaces; the transmitter transmits a fifth signal to the first device, wherein the fifth signal indicates at least one PRB of the one or more PRBs for transmission of control information; and the receiver receives control information from the first device on the at least one PRB.

One method for interlace determination includes determining a system bandwidth including multiple interlaces. Each interlace of the multiple interlaces includes a set of PRBs that are uniformly spaced in frequency, and, in some embodiments, each interlace of the multiple interlaces has a frequency span that exceeds a predetermined percent of the system bandwidth. The method also includes determining a first set of interlaces of the multiple interlaces for a first device. The first set of interlaces includes one or more interlaces. In certain embodiments, the method includes transmitting a first signal to the first device. The first signal indicates the first set of interlaces, and a number of bits of the first signal is less than a number of interlaces of the multiple interlaces. In some embodiments, the method includes receiving data from the first device on the first set of interlaces.

Another apparatus for interlace determination includes a processor that determines a system bandwidth including multiple interlaces. Each interlace of the multiple interlaces includes a set of PRBs that are uniformly spaced in frequency, and, in some embodiments, each interlace of the multiple interlaces has a frequency span that exceeds a predetermined percent of the system bandwidth. In certain embodiments, the apparatus includes a receiver that receives a first signal. The first signal indicates a first set of interlaces including one or more interlaces, and a number of bits of the first signal is less than a number of interlaces of the multiple interlaces. In some embodiments, the apparatus includes a transmitter that transmits data on the first set of interlaces.

In some embodiments, the predetermined percent is 80 percent. In one embodiment, each interlace of the multiple interlaces includes a number of PRBs selected from the group including 8, 10, and 12. In various embodiments, the first set of interlaces includes at least two interlaces and PRBs in the first set of interlaces are uniformly spaced in frequency. In some embodiments, the first set of interlaces includes at least two interlaces and the at least two interlaces are consecutive in frequency. In certain embodiments, the first set of interlaces includes N interlaces, N is greater than one, the first set of interlaces includes a first subset of interlaces and a second subset of interlaces, the first subset of interlaces includes $$\left\lceil \frac{N}{2} \right\rceil$$

interlaces, the second subset of interlaces includes $$\left(\left\lceil \frac{N}{2} \right\rceil - 1\right)$$

interlaces, interlaces of the first subset of interlaces are consecutive in frequency, and interlaces of the second subset of interlaces are consecutive in frequency.

In some embodiments, the receiver receives a second signal indicating one or more of the number of interlaces in the multiple interlaces and a number of PRBs in each interlace of the multiple interlaces. In certain embodiments, the processor determines one or more PRBs not included in the multiple interlaces; the receiver receives a fourth signal indicating whether the one or more PRBs are assigned for data transmission; and the transmitter transmits data on the one or more PRBs. In various embodiments, the processor determines one or more PRBs not included in the multiple interlaces; and the transmitter transmits data on the one or more PRBs if the first set of interlaces includes a predetermined interlace. In some embodiments, the processor determines one or more PRBs not included in the multiple interlaces; the receiver receives a fifth signal indicating at least one PRB of the one or more PRBs for transmission of control information; and the transmitter transmits control information on the at least one PRB. In one embodiment, the processor determines a number of PRBs, denoted as Q, in the first set of interlaces; and excludes M PRBs in the first set of interlaces for data transmission, wherein M is a minimum non-negative integer value in which Q-M is not divisible by an integer other than 2, 3, or 5.

Another method for interlace determination includes determining a system bandwidth including multiple interlaces. Each interlace of the multiple interlaces includes a set of PRBs that are uniformly spaced in frequency, and, in some embodiments, each interlace of the multiple interlaces has a frequency span that exceeds a predetermined percent of the system bandwidth. In certain embodiments, the method includes receiving a first signal. The first signal indicates a first set of interlaces including one or more interlaces, and a number of bits of the first signal is less than a number of interlaces of the multiple interlaces. In some embodiments, the method includes transmitting data on the first set of interlaces.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
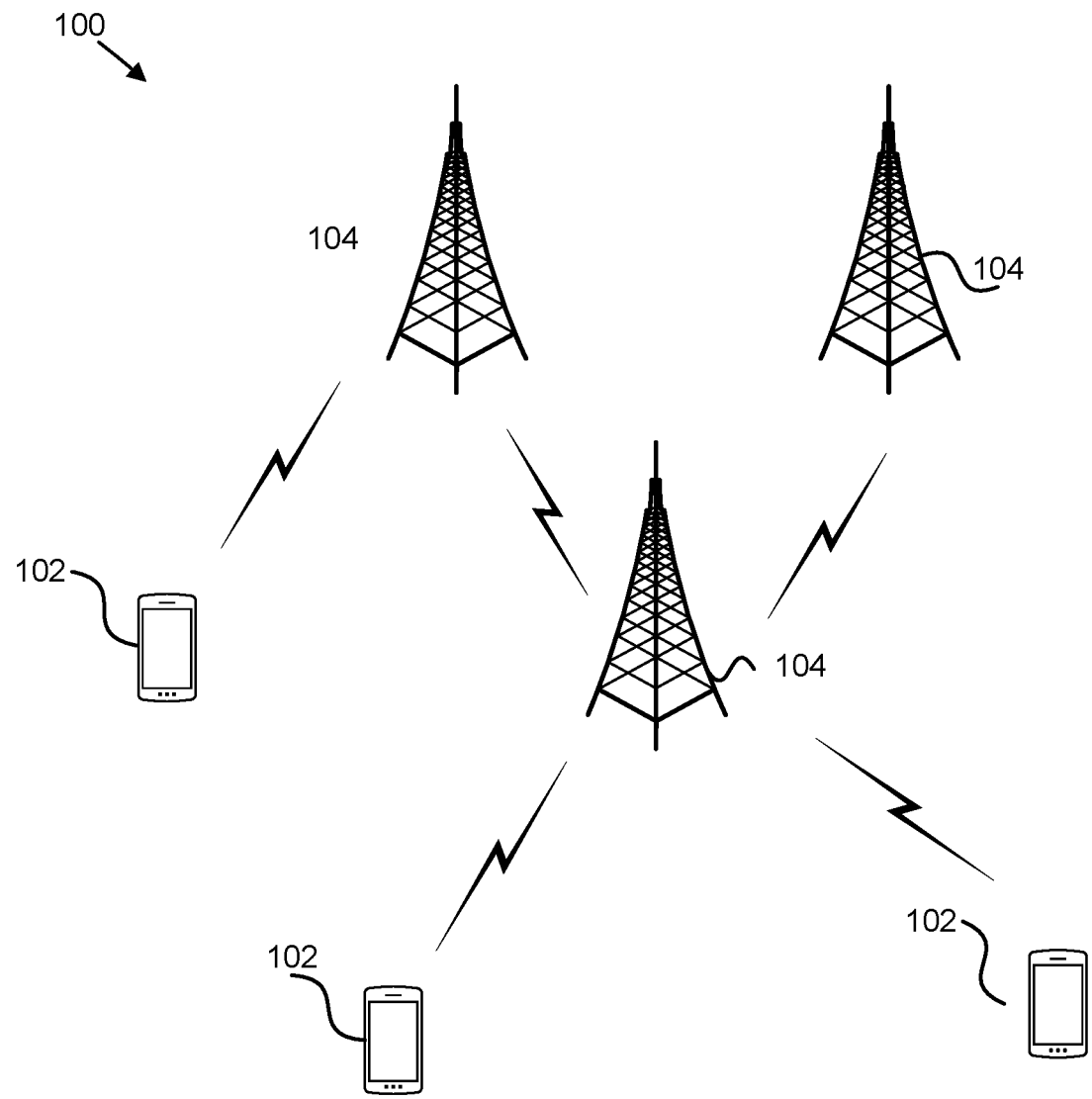
FIG. 1 is a schematic block diagram illustrating one embodiment of a wireless communication system for interlace determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for interlace determination. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. In another implementation, the remote units 102 transmit on the UL using a Block-IFDMA scheme when it is operated on unlicensed spectrum. In Block-IFDMA, the minimum transmission unit is one interlace, which is a set of RBs uniformly spaced in frequency and has a frequency span that exceeds a predetermined percent of the system bandwidth. For a 20 MHz system bandwidth with 100 PRBs, if it is divided into 10 interlaces, then the $k^{th}$ interlace is composed of the PRBs {k, k+10, k+20, . . . , k+90} and the $(k+1)^{th}$ interlace is composed of the PRBs {k+1, k+11, k+21, . . . , k+91}, $0<=k<=9$. In another implementation, the wireless communication system 100 is compliant with NB-IoT. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., remote unit 102) may determine a system bandwidth including multiple interlaces. Each interlace of the multiple interlaces may include: a set of PRBs that are uniformly spaced in frequency; and a frequency span that exceeds a predetermined percent of the system bandwidth. In certain embodiments, the apparatus may receive a first signal. The first signal may indicate a first set of interlaces including one or more interlaces, and a number of bits of the first signal is less than a number of interlaces of the multiple interlaces. In some embodiments, the apparatus may transmit data on the first set of interlaces. Therefore, the remote unit 102 may determine a set of interlaces for a device that meets certain operational requirements.

In a further embodiment, an apparatus (e.g., base unit 104) may determine a system bandwidth including multiple interlaces. Each interlace of the multiple interlaces may include: a set of PRBs that are uniformly spaced in frequency; and a frequency span that exceeds a predetermined percent of the system bandwidth. The apparatus may also determine a first set of interlaces of the multiple interlaces for a first device. The first set of interlaces may include one or more interlaces. In certain embodiments, the apparatus may transmit a first signal to the first device. The first signal may indicate the first set of interlaces, and a number of bits of the first signal is less than a number of interlaces of the multiple interlaces. In some embodiments, the apparatus receives data from the first device on the first set of interlaces.

Figure 2:
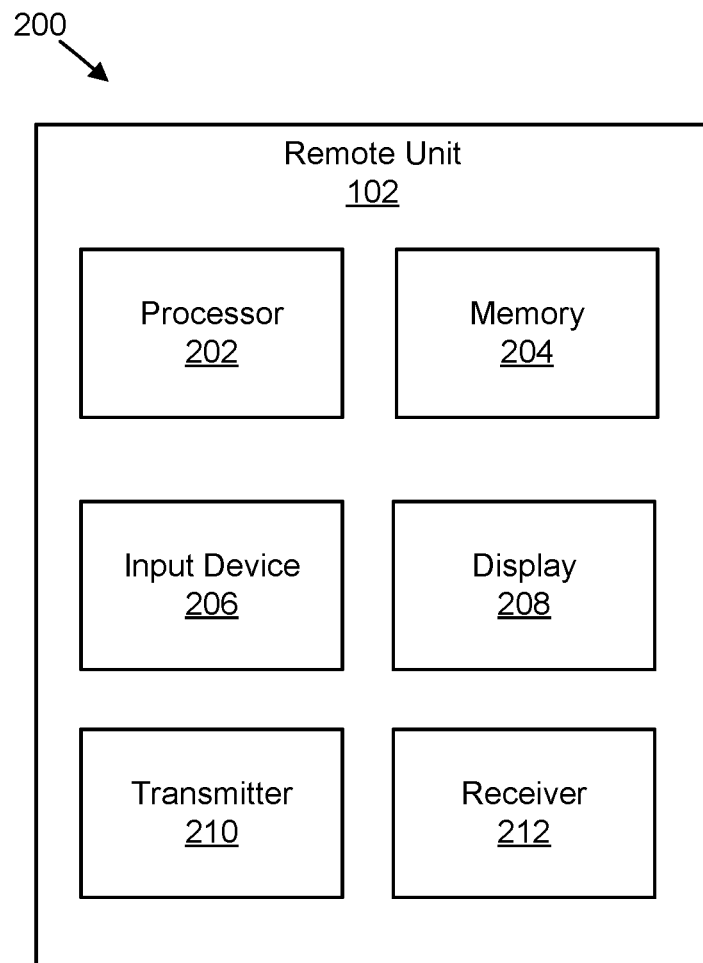
FIG. 2 is a schematic block diagram illustrating one embodiment of an apparatus that may be used for interlace determination.

FIG. 2 depicts one embodiment of an apparatus 200 that may be used for interlace determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine RE usage in CCEs being received.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 is used to receive a signal indicating a set of interlaces to be used. In one embodiment, the transmitter 210 is used to transmit data, feedback information, and/or an indication to the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
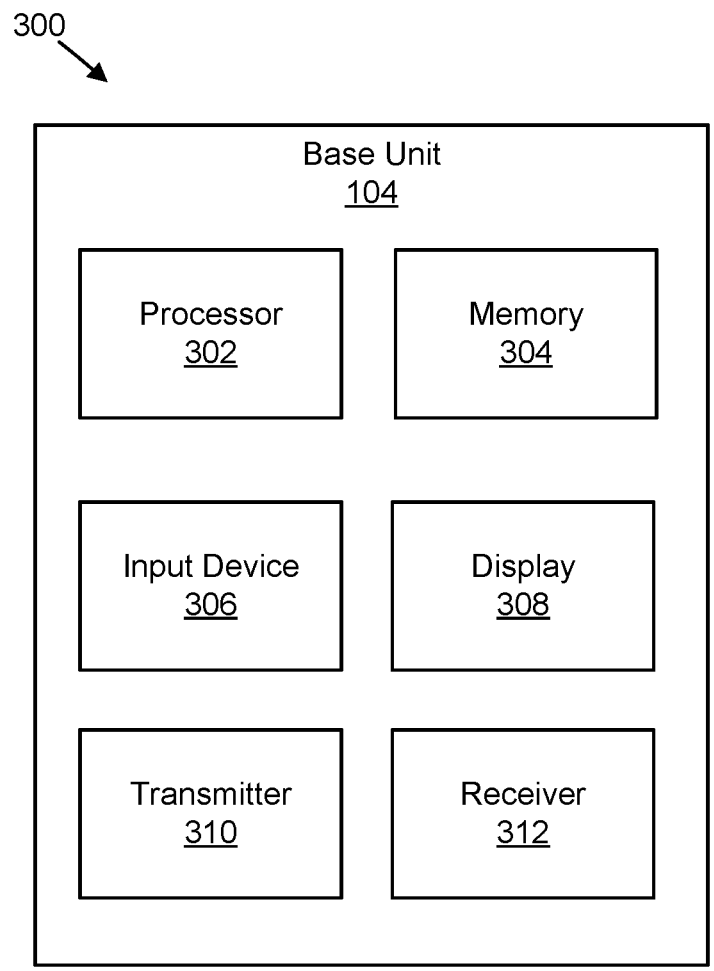
FIG. 3 is a schematic block diagram illustrating one embodiment of an apparatus that may be used for interlace determination.

FIG. 3 depicts one embodiment of an apparatus 300 that may be used for interlace determination. The apparatus 300 includes one embodiment of the base unit 104. Furthermore, the base unit 104 may include a processor 302, a memory 304, an input device 306, a display 308, a transmitter 310, and a receiver 312. It should be noted that the processor 302, the memory 304, the input device 306, and the display 308 may be substantially similar to the processor 202, the memory 204, the input device 206, and the display 208 of the remote unit 102, respectively. In certain embodiments, the processor 302 may be used to determine a set of interlaces to be used by a device.

The transmitter 310 is used to provide DL communication signals to the remote unit 102 and the receiver 312 is used to receive UL communication signals from the remote unit 102. In certain embodiments, the transmitter 310 is used to transmit a signal to a device, for example, to indicate a set of interlaces for the device to use. In one embodiment, the receiver 312 may be used to receive data from the device on the set of interlaces. It should be noted that, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
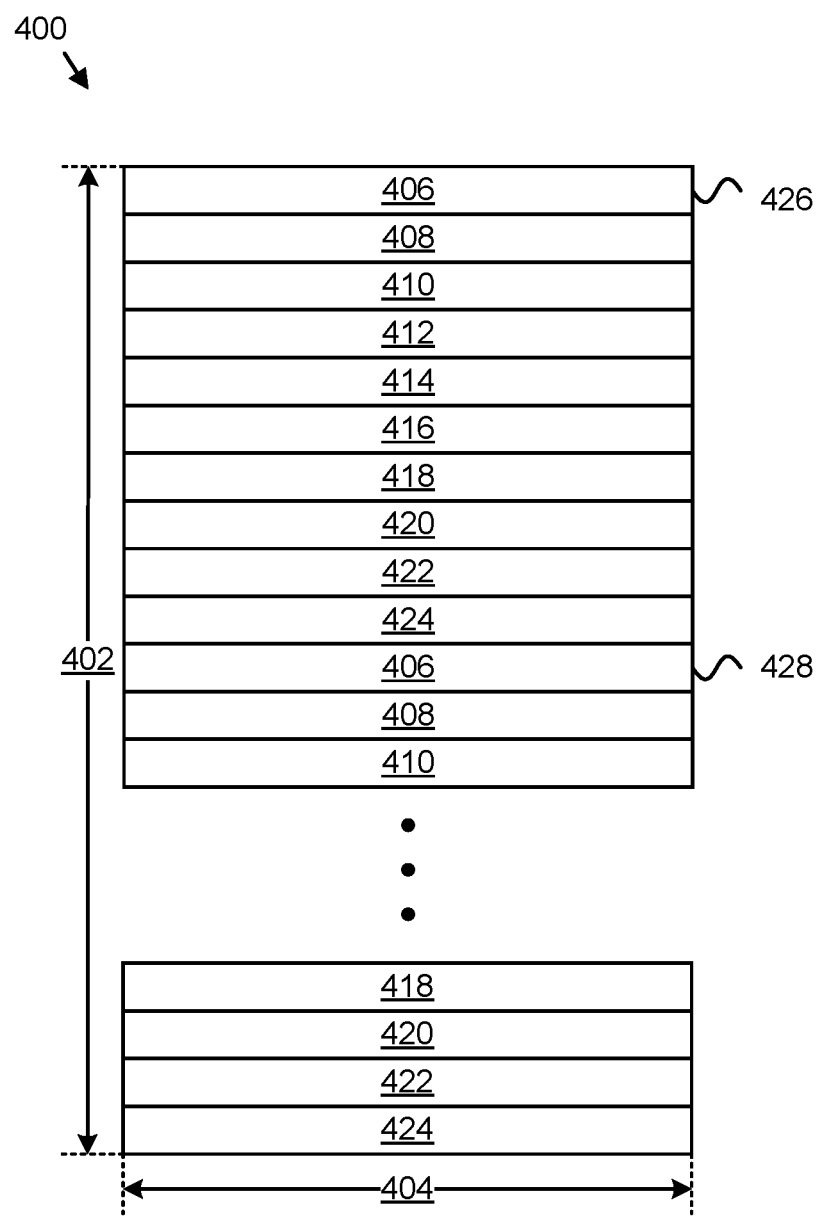
FIG. 4 illustrates one embodiment of an interlace configuration.

FIG. 4 illustrates one embodiment of an interlace configuration 400. The interlace configuration 400 occupies a bandwidth 402 (e.g., system bandwidth) over a period of time 404. The bandwidth 402 may be any suitable bandwidth. In certain embodiments, the bandwidth 402 may be at least 5 MHz to meet a nominal channel bandwidth requirement. In some embodiments, the bandwidth 402 may be 5 MHz, 10 MHz, 20 MHz, and so forth. The period of time 404 may be 1 ms (e.g., one subframe) or 0.5 ms (e.g., one slot).

The interlace configuration 400 includes multiple interlaces 406, 408, 410, 412, 414, 416, 418, 420, 422, and 424 that span over the bandwidth 402. Each interlace 406, 408, 410, 412, 414, 416, 418, 420, 422, and 424 includes multiple PRBs. For example, a first portion 426 of interlace 406 includes one PRB and a second portion 428 of interlace 406 includes one PRB. Moreover, additional portions of interlace 406 also include one PRB. Furthermore, each PRB of interlace 406 may be uniformly spaced in frequency. Each interlace 406, 408, 410, 412, 414, 416, 418, 420, 422, and 424 may be similar to the example given regarding interlace 406. Moreover, the PRBs of each interlace 406, 408, 410, 412, 414, 416, 418, 420, 422, and 424 are adjacent to one another. Furthermore, the PRBs of an interlace (e.g., the first portion 426 and the second portion 428, the second portion 428 and a third PRB of interlace 406) are separated by substantially equal (e.g., similar) frequencies. It should be noted that the interlaces 406 and 408 are adjacent in frequency, the interlaces 408 and 410 are adjacent in frequency, the interlaces 410 and 412 are adjacent in frequency, the interlaces 412 and 414 are adjacent in frequency, the interlaces 414 and 416 are adjacent in frequency, the interlaces 416 and 418 are adjacent in frequency, the interlaces 418 and 420 are adjacent in frequency, the interlaces 420 and 422 are adjacent in frequency, the interlaces 422 and 424 are adjacent in frequency, and certain interlaces 424 are adjacent in frequency to certain interlaces 406. For a given system bandwidth, assuming there are X PRBs $\{0, 1, \ldots, X-1\}$ available to be equally divided to Y interlaces $\{0, 1, \ldots, Y-1\}$, then each interlace is composed of X/Y PRBs and has a frequency span that exceeds a predetermined percent of the system bandwidth. So the $k^{th}$ interlace is composed of the PRBs $\{k, k+Y, k+2Y, \ldots, k+(X/Y-1)Y\}$ and the $(k+1)^{th}$ interlace is composed of the PRBs $\{k+1, k+1+Y, k+1+2Y, \ldots, k+1+(X/Y-1)Y\}$, where, $0<=k<=Y-1$. Then the two interlaces, the $(k+1)^{th}$ interlace and the $k^{th}$ interlace, are adjacent in frequency. For example, for a 20 MHz system bandwidth with 100 PRBs, if it is divided into 10 interlaces, then the $k^{th}$ interlace is composed of the PRBs $\{k, k+10, k+20, \ldots, k+90\}$ and the $(k+1)^{th}$ interlace is composed of the PRBs $\{k+1, k+11, k+21, \ldots, k+91\}$, $0<=k<=9$. So the two interlaces, the $k^{th}$ interlace and the $(k+1)^{th}$ interlace are adjacent to each other and consecutive in frequency. Similarly, the $k^{th}$ interlace and the $(k-1)^{th}$ interlace are also adjacent to each other and consecutive in frequency. In another example, two interlaces being adjacent in frequency may mean that all the PRBs of one interlace (e.g., PRB $\{x, y, z,$ and so forth$\}$) that are uniformly spaced in frequency are adjacent to all the PRBs of another interlace (e.g., PRB$\{x+/-1, y+/-1, z+/-1,$ and so forth$\}$).

Although the interlace configuration 400 is illustrated with 10 interlaces, the interlace configuration 400 may include any suitable number of interlaces. For example, the interlace configuration 400 may include 2, 3, 4, 5, 8, or 10 interlaces. It should be noted that each interlace may include a sufficient number of uniformly spaced PRBs to occupy between 80% and 100% of the system bandwidth 402.

It should be noted that the minimum distance between two PRBs of one interlace is more than 1 MHz (e.g., each PRB may occupy approximately 180 KHz so 180 KHz* 10=1.8 MHz) for interlace configurations 400 with 10 interlaces. Therefore one PRB within each interlace 406, 408, 410, 412, 414, 416, 418, 420, 422, and 424 may be transmitted with 10 dBm power and the maximum TX power for one interlace may be 20 dBm. In some embodiments, one or more interlaces 406, 408, 410, 412, 414, 416, 418, 420, 422, and 424 may include any suitable number of PRBs, such as, for example, each interlace including 10 PRBs. In various embodiments, interlaces may include 8, 10, or 12 PRBs.

Each interlace may include a set of PRBs that are uniformly spaced in frequency, and one interlace in the bandwidth 402 may have a frequency span that exceeds a predetermined percent of the system bandwidth. PRBs in an interlace that are uniformly spaced may mean that the frequency spacing between neighboring PRBs in an interlace are similar, near each other, close to the same, but need not be exact. For example, PRBs that are uniformly spaced may be within a tolerance of 0.5%, 1%, 2%, 3%, 5%, or 10% of each other. The predetermined percent may be any suitable value, such as 60%, 70%, 80% or 90%. In certain embodiments, more than one interlace may be allocated to a remote unit 102. For example, 1, 2, 3, 4, 5, 6, 7, 8, 9, or 10 interlaces may be allocated to a remote unit 102 in the illustrated embodiment. As such, the total number of PRBs allocated to a remote unit 102 may, in various embodiments, include 8, 10, 12, 16, 20, 24, 25, 30, 36, 40, 48, 50, 60, 70, 72, 80, 84, 90, or 100 PRBs.

Figure 5:
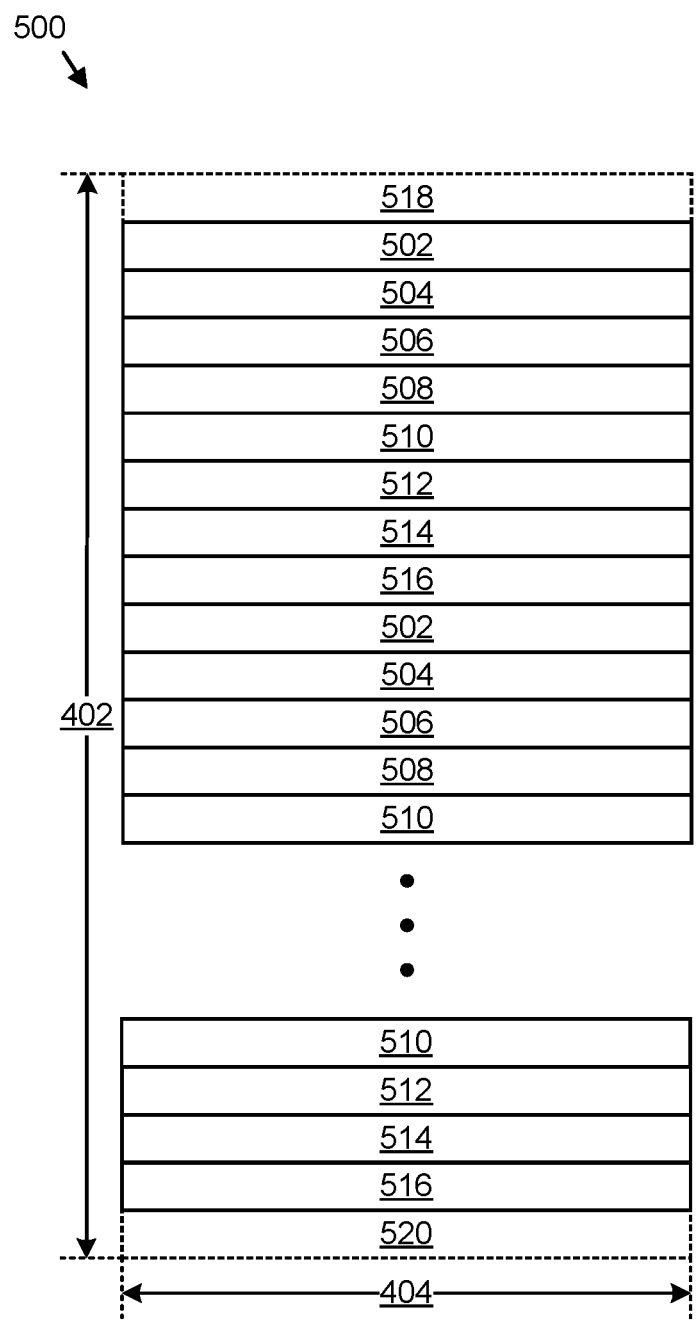
FIG. 5 illustrates another embodiment of an interlace configuration.

FIG. 5 illustrates another embodiment of an interlace configuration 500. The interlace configuration 500 occupies the bandwidth 402 over the period of time 404, which may be similar to the bandwidth 402 and the period of time 404 of the interlace configuration 500. The interlace configuration 500 also includes multiple interlaces 502, 504, 506, 508, 510, 512, 514, and 516 that span over the bandwidth 402, which may be similar to the interlaces 406, 408, 410, 412, 414, 416, 418, 420, 422, and 424 of the interlace configuration 400.

The interlace configuration 500 also may include PRBs 518 and/or 520 that are not allocated to one of the interlaces 502, 504, 506, 508, 510, 512, 514, and 516. For example, each of the 8 interlaces 502, 504, 506, 508, 510, 512, 514, and 516 may be allocated 12 PRBs. Therefore, because there may be 100 total PRBs used in a 20 MHz configuration, the PRBs 518 and/or 520 may include 4 PRBs (e.g., 100−8*12) that are not allocated to one of the interlaces 502, 504, 506, 508, 510, 512, 514, and 516.

In one embodiment, the PRBs 518 may include half of the non-allocated PRBs, and the PRBs 520 may include half of the non-allocated PRBs. In some embodiments, the PRBs 518 may include a first portion of the non-allocated PRBs, and the PRBs 520 may include a second portion of the non-allocated PRBs, and the first and second portions may be unequal. In another embodiment, the PRBs 518 may include all of the non-allocated PRBs, and the PRBs 520 may include none of the non-allocated PRBs. In a further embodiment, the PRBs 518 may include none of the non-allocated PRBs, and the PRBs 520 may include all of the non-allocated PRBs. In certain embodiments, the PRBs 518 and/or 520 may be located at the beginning and/or the end of the bandwidth 402 frequency range, while in other embodiments, the PRBs 518 and/or 520 may be located at any location within the bandwidth 402.

In some embodiments, the PRBs 518 and/or 520 may be configured for PUCCH. In various embodiments, the PRBs 518 and/or 520 may be located in a fixed location that is fixed by specification or signaling. In one embodiment, the PRBs 518 and/or 520 may be allocated to a remote unit 102 in conjunction with one or more interlaces 502, 504, 506, 508, 510, 512, 514, and 516. For example, in one embodiment, all of the non-allocated PRBs are included in the PRBs 518, and the PRBs 518 are tied to the first instance of the interlace 502 so that the first instance of the interlace 502 includes 12 PRBs instead of 8 PRBs, while the remaining interlaces include 8 PRBs.

Figure 6:
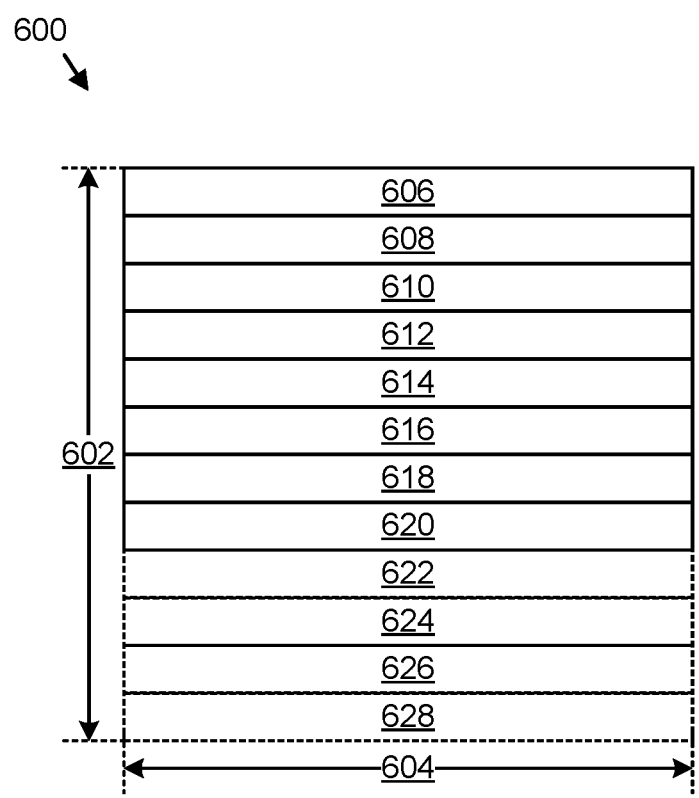
FIG. 6 illustrates one embodiment of an interlace.

FIG. 6 illustrates one embodiment of an interlace 600, such as one of the interlaces 406, 408, 410, 412, 414, 416, 418, 420, 422, 424, 502, 504, 506, 508, 510, 512, 514, and 516. The interlace 600 occupies a bandwidth 602 over a period of time 604. The bandwidth 602 may be any suitable bandwidth, and may be dependent on a number of PRBs in the interlace. For example, the bandwidth 602 may equal the number of PRBs in the interlace *180 KHz. In some embodiments, the bandwidth 602 may be 1.44 MHz, 1.8 MHz, 2.16 MHz, and so forth. The period of time 604 may be 0.5 ms (e.g., one slot) or 1 ms.

The interlace 600 includes multiple PRBs 606, 608, 610, 612, 614, 616, 618, 620, 622, 624, 626, and 628. Although the interlace 600 is illustrated with 12 PRBs, the interlace 600 may include any suitable number of PRBs. For example, the interlace 600 may include 8, 10, or 12 PRBs.

UL resource allocation, such as for using an unlicensed carrier, may be carried out in a variety of ways using various interlace configurations. It should be noted that various interlace configurations may satisfy one or more of the following elements: a number of interlaces in the interlace configuration, and a number of PRBs for each interlace may have an occupying bandwidth that spans at least 80% of the nominal bandwidth; various interlace partition schemes may be used to provide some scheduling flexibility; orthogonal resource allocation patterns may be used to match the resource allocation between two UEs (i.e., x interlaces for one UE and (N-x) interlaces for another UE, where N is the total number of interlaces for a given system bandwidth); and less signaling overhead than in other interlace configurations.

In certain embodiments, the number of interlaces and the number of PRBs in each interlace may be configured by a base unit 104 and indicated to served remote units 102, such as by using RRC signaling.

In some embodiments, to meet the regulation requirements, a 20 MHz nominal bandwidth may be divided into 8 interlaces or 10 interlaces as shown below. For a 10 MHz nominal bandwidth, due to the constraint of 80% nominal bandwidth, all available 50 PRBs may be divided into 5 interlaces with each interlace including 10 PRBs, or the 50 PRBs may be divided into 4 interlaces with each interlace including 12 PRBs. For a 5 MHz nominal bandwidth, all the available 25 PRBs may be divided into 2 interlaces with each interlace including 12 PRBs. The number of signaling bits for resource allocation pattern indication may be dependent on the concrete bandwidth value and the interlace size. The following two examples use a 20 MHz nominal bandwidth, however, the principles described may be extended to other bandwidth values.

EXAMPLE 1

In one embodiment, a 20 MHz nominal bandwidth may be divided into 8 interlaces with each interlace including 12 PRBs. When considering the ETSI bandwidth occupancy rule, 80% of 20 MHz corresponds to 16 MHz (which equals 88.9 PRBs). A design with 8 interlaces each having 12 PRBs may make each interlace occupy 16.02 MHz by spanning at least 89 PRBs, which fulfils the regulation requirements on occupied bandwidth. Moreover, a minimum distance between two adjacent RBs within one interlace is 1.44 MHz, which is larger than 1 MHz. In certain embodiments, one PRB within each interlace may be transmitted with 10 dBm power and a maximum TX power for one interlace is 20 dBm.

A resource allocation pattern may be formed in a variety of ways, two embodiments are provided below:

In a first embodiment, a series of resource allocation patterns may be used to indicate which of four cases may be used. One example of resource allocation patterns is shown in Table 2 and four bits in an UL grant may be used to indicate one specific resource pattern to a remote unit 102. Case 1: one-interlace is allocated per remote unit 102 with 8 patterns used, and one pattern is indicated to one remote unit 102. Case 2: two-interlaces are allocated per remote unit 102 with 4 patterns used, and one pattern is indicated to one remote unit 102. Case 3: four-interlaces are allocated per remote unit 102 with 2 patterns used, and one pattern is indicated to one remote unit 102. Case 4: the whole bandwidth is allocated to one remote unit 102 with one pattern used, and the one pattern is indicated to the remote unit 102. In this embodiment, a first remote unit 102 may have 1, 2, 4, or 8 interlaces allocated to it, and other remote units 102 have the same number of interlaces as the first remote unit 102.

A second embodiment allows for flexible scheduling by providing more cases. Table 3 shows one example for resource allocation with supported interlace combinations from 1 to 8 that may be allocated to one remote unit 102. In this embodiment, six bits in an UL grant may be used to indicate one specific resource pattern to a remote unit 102. Moreover, a first remote unit 102 may have 1, 2, 3, 4, 5, 6, 7, or 8 interlaces allocated to it, and other remote units 102 may have any of the remaining interlaces allocated.

In either the first or second embodiments, only 96 PRBs (e.g., 8 interlaces *12 PRBs per interlace) out of 100 PRBs (e.g., using 90% of the 20 MHz bandwidth) may be used. Regarding the remaining PRBs, they may be used in any of a number of different ways.

For example, the remaining PRBs may be consecutively located on both band edges (e.g., the edges of the frequency range) with an equal number of PRBs for each edge. The remaining PRBs may be configured for transmission of control information (e.g., PUCCH). In one embodiment, a base unit 104 may indicate to a remote unit 102 at least one PRB for transmission of control information. In another embodiment, the remaining PRBs may be configured for transmission of data. In such an embodiment, a base unit 104 may indicate to a remote unit 102 at least one PRB for data transmission.

As another example, the remaining PRBs mat be consecutively located on both band edges with equal number of PRBs for each edge or on only one band edge. The concrete location of the remaining PRBs may be fixed in a specification or via signaling (e.g., RRC signaling). The remaining PRBs may be allocated to a remote unit 102 in addition to an indicated resource pattern, such as by binding these PRBs with some specific resource pattern in Table 2 or 3. For example, the remaining PRBs may be bound to one or more predetermined interlaces. In one embodiment, the remaining PRBs may be bound to a first interlace, a last interlace, a first instance of the first interlace, a last instance of a last interlace, and so forth. The one or more predetermined interlaces may be determined via specification or signaling (e.g., RRC signaling). In another embodiment, when one remote unit 102 is provided an indication of a predetermined a resource allocation pattern index (e.g., index 0, 8, 12, 14 in Table 2), the remote unit 102 may know that it can use the interlaces associated with the resource allocation pattern index and the remaining PRBs.

In some embodiments, based on the LTE UL principles, the allowed DFT number of PRBs allocated to a remote unit 102 may be limited to non-negative integer values that are multiples of 2, 3, and 5 to allow for efficient DFT implementation. As shown in Table 2, using 8-interlace structure, the number of allocated PRBs for one remote unit 102 may meet this DFT implementation requirement (e.g., all allocated PRBs are multiples of at least 2). However, considering the four remaining PRBs that may additionally be allocated to a remote unit 102, a remote unit 102 may trim the allocated number of PRBs (e.g., Q) to the nearest number which may be a multiple of 2, 3, or 5. In one embodiment, the PRBs with the M largest PRB indices may not be used if the allocated PRB number Q is not a multiple of 2, 3, or 5, and if the allocated PRB number Q minus M is equal to the nearest number which is a multiple of 2, 3, or 5. For example, if a remote unit 102 is allocated 36 PRBs plus 1 of the remaining PRBs for a total of 37 PRBs (e.g., Q=37), 37 PRBs is not a multiple of 2, 3, or 5. The lowest number of M that may be subtracted from Q to result in a multiple of 2, 3, or 5 is if M=1. Thus, in this example, 1 PRB out of the 37 allocated PRBs would be trimmed and not used.

TABLE 2

20 MHz Bandwidth and 8-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0, 0, 0, 0, 0 | 1 | 12 | |
| 1 | 0, 1, 0, 0, 0, 0, 0, 0 | 1 | 12 | |
| 2 | 0, 0, 1, 0, 0, 0, 0, 0 | 1 | 12 | |
| 3 | 0, 0, 0, 1, 0, 0, 0, 0 | 1 | 12 | |
| 4 | 0, 0, 0, 0, 1, 0, 0, 0 | 1 | 12 | |
| 5 | 0, 0, 0, 0, 0, 1, 0, 0 | 1 | 12 | |
| 6 | 0, 0, 0, 0, 0, 0, 1, 0 | 1 | 12 | |
| 7 | 0, 0, 0, 0, 0, 0, 0, 1 | 1 | 12 | |
| 8 | 1, 0, 0, 0, 1, 0, 0, 0 | 2 | 24 | |
| 9 | 0, 1, 0, 0, 0, 1, 0, 0 | 2 | 24 | |
| 10 | 0, 0, 1, 0, 0, 0, 1, 0 | 2 | 24 | |
| 11 | 0, 0, 0, 1, 0, 0, 0, 1 | 2 | 24 | |
| 12 | 1, 1, 0, 0, 1, 1, 0, 0 | 4 | 48 | Another alternative: 1, 0, 1, 0, 1, 0, 1, 0 |
| 13 | 0, 0, 1, 1, 0, 0, 1, 1 | 4 | 48 | Another alternative: 0, 1, 0, 1, 0, 1, 0, 1 |
| 14 | 1, 1, 1, 1, 1, 1, 1, 1 | 8 | 100 | All the PRBs are allocated. |

TABLE 3

20 MHz Bandwidth and 8-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0, 0, 0, 0, 0 | 1 | 12 | |
| 1 | 0, 1, 0, 0, 0, 0, 0, 0 | 1 | 12 | |
| 2 | 0, 0, 1, 0, 0, 0, 0, 0 | 1 | 12 | |
| 3 | 0, 0, 0, 1, 0, 0, 0, 0 | 1 | 12 | |
| 4 | 0, 0, 0, 0, 1, 0, 0, 0 | 1 | 12 | |
| 5 | 0, 0, 0, 0, 0, 1, 0, 0 | 1 | 12 | |
| 6 | 0, 0, 0, 0, 0, 0, 1, 0 | 1 | 12 | |
| 7 | 0, 0, 0, 0, 0, 0, 0, 1 | 1 | 12 | |
| 8 | 1, 0, 0, 0, 1, 0, 0, 0 | 2 | 24 | |
| 9 | 0, 1, 0, 0, 0, 1, 0, 0 | 2 | 24 | |
| 10 | 0, 0, 1, 0, 0, 0, 1, 0 | 2 | 24 | |
| 11 | 0, 0, 0, 1, 0, 0, 0, 1 | 2 | 24 | |
| 12 | 1, 0, 0, 1, 1, 0, 0, 0 | 3 | 36 | |
| 13 | 1, 0, 0, 0, 1, 0, 0, 1 | 3 | 36 | |
| 14 | 0, 0, 1, 1, 0, 0, 0, 1 | 3 | 36 | |
| 15 | 0, 0, 0, 1, 0, 0, 1, 1 | 3 | 36 | |
| 16 | 1, 1, 0, 0, 1, 1, 0, 0 | 4 | 48 | |
| 17 | 0, 1, 1, 0, 0, 1, 1, 0 | 4 | 48 | |
| 18 | 1, 0, 0, 1, 1, 0, 0, 1 | 4 | 48 | |
| 19 | 0, 0, 1, 1, 0, 0, 1, 1 | 4 | 48 | |
| 20 | 1, 0, 1, 0, 1, 0, 1, 0 | 4 | 48 | |
| 21 | 0, 1, 0, 1, 0, 1, 0, 1 | 4 | 48 | |
| 22 | 1, 1, 1, 0, 1, 1, 0, 0 | 5 | 60 | |
| 23 | 1, 1, 0, 0, 1, 1, 1, 0 | 5 | 60 | |
| 24 | 0, 1, 1, 1, 0, 1, 1, 0 | 5 | 60 | |
| 25 | 0, 1, 1, 0, 0, 1, 1, 1 | 5 | 60 | |
| 26 | 1, 1, 1, 0, 1, 1, 1, 0 | 6 | 72 | |
| 27 | 0, 1, 1, 1, 0, 1, 1, 1 | 6 | 72 | |
| 28 | 1, 1, 0, 1, 1, 1, 0, 1 | 6 | 72 | |
| 29 | 1, 0, 1, 1, 1, 0, 1, 1 | 6 | 72 | |
| 30 | 1, 1, 1, 1, 1, 1, 1, 0 | 7 | 84 | |
| 31 | 1, 1, 1, 1, 1, 1, 0, 1 | 7 | 84 | |
| 32 | 1, 1, 1, 1, 1, 0, 1, 1 | 7 | 84 | |
| 33 | 1, 1, 1, 1, 0, 1, 1, 1 | 7 | 84 | |
| 34 | 1, 1, 1, 0, 1, 1, 1, 1 | 7 | 84 | |
| 35 | 1, 1, 0, 1, 1, 1, 1, 1 | 7 | 84 | |
| 36 | 1, 0, 1, 1, 1, 1, 1, 1 | 7 | 84 | |
| 37 | 0, 1, 1, 1, 1, 1, 1, 1 | 7 | 84 | |
| 38 | 1, 1, 1, 1, 1, 1, 1, 1 | 8 | 100 | All the PRBs are allocated. |

EXAMPLE 2

In certain embodiments, a 20 MHz nominal bandwidth may be divided into 10 interlaces with each interlace including 10 PRBs. When considering the ETSI bandwidth occupancy rule, 80% of 20 MHz corresponds to 16 MHZ which equals 88.9 PRBs). A design with 10 interlaces each having 10 PRBs may make each interlace occupy 16.38 MHz by spanning at least 91 PRBs, which fulfils the regulation requirements on occupied bandwidth. Moreover, a minimum distance between two adjacent RBs within one interlace is 1.8 MHz, which is larger than 1 MHz. In one embodiment, one PRB within each interlace can be transmitted with 10 dBm power and a maximum TX power for one interlace is 20 dBm.

A resource allocation pattern may be formed in a variety of ways, two embodiments are provided below:

In a first embodiment, a series of resource allocation patterns may be used to indicate which of six cases may be used. One example of resource allocation patterns is shown in Table 4 and five bits in an UL grant may be used to indicate one specific resource pattern to a remote unit 102. Case 1: one-interlace is allocated per remote unit 102 with 10 patterns used, and one pattern is indicated one remote unit 102. Case 2: two-interlaces are allocated per remote unit 102 with 5 patterns used, and one pattern is indicated to one remote unit 102. Case 3: four-interlaces are allocated per remote unit 102 with 4 patterns used, and one pattern is indicated to one remote unit 102. Case 4: six-interlaces are allocated per remote unit 102 with 3 patterns used, and one pattern is indicated to one remote unit 102. Case 5: eight-interlaces are allocated per remote unit 102 with 2 patterns used, and one pattern is indicated to one remote unit 102. Case 6: the whole bandwidth is allocated to one remote unit 102 with one pattern used, and the one pattern is indicated to the remote unit 102. In this embodiment, a first remote unit 102 may have 1, 2, 4, 6, 8, or 10 interlaces allocated to it, and other remote units 102 have 1, 2, 4, 6, or 8 interlaces allocated such that a sum of the allocation to the first remote unit 102 and the other remote units 102 equals 10.

A second embodiment allows for flexible scheduling by providing more cases. Table 5 shows one example for resource allocation with supported interlace combinations from 1 to 10 that may be allocated to one remote unit 102. In this embodiment, seven bits in an UL grant may be used to indicate one specific resource pattern to a remote unit 102. Moreover, a first remote unit 102 may have 1, 2, 3, 4, 5, 6, 7, 8, 9, or 10 interlaces allocated to it, and other remote units 102 may have any of the remaining interlaces allocated.

Based on the resource allocation in Table 4, there may be no DFT issues. However, in Table 5, for some resource allocations, a remote unit 102 may trim the allocated number of PRBs (e.g., Q) to the nearest number which is not divisible by an integer other than 2, 3, or 5. In one embodiment, a set of interlaces having a number of PRBs, denoted as Q, may exclude M PRBs from the set of interlaces for data transmission. M may be a minimum non-negative integer value in which Q-M is not divisible by an integer other than 2, 3, or 5. For example, in Table 5, when the number of allocated PRBs for one remote unit 102 is 70, 70 is not appropriate for DFT because 70=2*5*7, which is divisible by an integer other than 2, 3, or 5 (e.g., 7). In such an example, M may equal 6 so that Q-M equals 64 which is the maximum number of PRBs that is less than 70 and only divisible by the integers 2, 3, or 5.

TABLE 4

20 MHz Bandwidth and 10-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0, 0, 0, 0, 0, 0, 0 | 1 | 10 | |
| 1 | 0, 1, 0, 0, 0, 0, 0, 0, 0, 0 | 1 | 10 | |
| 2 | 0, 0, 1, 0, 0, 0, 0, 0, 0, 0 | 1 | 10 | |
| 3 | 0, 0, 0, 1, 0, 0, 0, 0, 0, 0 | 1 | 10 | |
| 4 | 0, 0, 0, 0, 1, 0, 0, 0, 0, 0 | 1 | 10 | |
| 5 | 0, 0, 0, 0, 0, 1, 0, 0, 0, 0 | 1 | 10 | |
| 6 | 0, 0, 0, 0, 0, 0, 1, 0, 0, 0 | 1 | 10 | |
| 7 | 0, 0, 0, 0, 0, 0, 0, 1, 0, 0 | 1 | 10 | |
| 8 | 0, 0, 0, 0, 0, 0, 0, 0, 1, 0 | 1 | 10 | |
| 9 | 0, 0, 0, 0, 0, 0, 0, 0, 0, 1 | 1 | 10 | |
| 10 | 1, 0, 0, 0, 0, 1, 0, 0, 0, 0 | 2 | 20 | |
| 11 | 0, 1, 0, 0, 0, 0, 1, 0, 0, 0 | 2 | 20 | |
| 12 | 0, 0, 1, 0, 0, 0, 0, 1, 0, 0 | 2 | 20 | |
| 13 | 0, 0, 0, 1, 0, 0, 0, 0, 1, 0 | 2 | 20 | |
| 14 | 0, 0, 0, 0, 1, 0, 0, 0, 0, 1 | 2 | 20 | |
| 15 | 1, 1, 0, 0, 0, 1, 1, 0, 0, 0 | 4 | 40 | |
| 16 | 0, 1, 1, 0, 0, 0, 1, 1, 0, 0 | 4 | 40 | |
| 17 | 0, 0, 1, 1, 0, 0, 0, 1, 1, 0 | 4 | 40 | |
| 18 | 0, 0, 0, 1, 1, 0, 0, 0, 1, 1 | 4 | 40 | |
| 19 | 1, 1, 1, 0, 0, 1, 1, 1, 0, 0 | 6 | 60 | |
| 20 | 1, 0, 0, 1, 1, 1, 0, 0, 1, 1 | 6 | 60 | |
| 21 | 1, 1, 0, 0, 1, 1, 1, 0, 0, 1 | 6 | 60 | |
| 22 | 0, 0, 1, 1, 1, 0, 0, 1, 1, 1 | 6 | 60 | |
| 23 | 1, 1, 1, 1, 0, 1, 1, 1, 1, 0 | 8 | 80 | |
| 24 | 0, 1, 1, 1, 1, 0, 1, 1, 1, 1 | 8 | 80 | |
| 25 | 1, 0, 1, 1, 1, 1, 0, 1, 1, 1 | 8 | 80 | |
| 26 | 1, 1, 0, 1, 1, 1, 1, 0, 1, 1 | 8 | 80 | |
| 27 | 1, 1, 1, 0, 1, 1, 1, 1, 0, 1 | 8 | 80 | |
| 28 | 1, 1, 1, 1, 1, 1, 1, 1, 1, 1 | 10 | 100 | All the PRBs are allocated. |

TABLE 5

20 MHz Bandwidth and 10-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0, 0, 0, 0, 0, 0, 0 | 1 | 10 | |
| 1 | 0, 1, 0, 0, 0, 0, 0, 0, 0, 0 | 1 | 10 | |
| 2 | 0, 0, 1, 0, 0, 0, 0, 0, 0, 0 | 1 | 10 | |
| 3 | 0, 0, 0, 1, 0, 0, 0, 0, 0, 0 | 1 | 10 | |
| 4 | 0, 0, 0, 0, 1, 0, 0, 0, 0, 0 | 1 | 10 | |
| 5 | 0, 0, 0, 0, 0, 1, 0, 0, 0, 0 | 1 | 10 | |
| 6 | 0, 0, 0, 0, 0, 0, 1, 0, 0, 0 | 1 | 10 | |
| 7 | 0, 0, 0, 0, 0, 0, 0, 1, 0, 0 | 1 | 10 | |
| 8 | 0, 0, 0, 0, 0, 0, 0, 0, 1, 0 | 1 | 10 | |
| 9 | 0, 0, 0, 0, 0, 0, 0, 0, 0, 1 | 1 | 10 | |
| 10 | 1, 0, 0, 0, 0, 1, 0, 0, 0, 0 | 2 | 20 | |
| 11 | 0, 1, 0, 0, 0, 0, 1, 0, 0, 0 | 2 | 20 | |
| 12 | 0, 0, 1, 0, 0, 0, 0, 1, 0, 0 | 2 | 20 | |
| 13 | 0, 0, 0, 1, 0, 0, 0, 0, 1, 0 | 2 | 20 | |
| 14 | 0, 0, 0, 0, 1, 0, 0, 0, 0, 1 | 2 | 20 | |
| 15 | 1, 1, 0, 0, 0, 1, 0, 0, 0, 0 | 3 | 30 | |
| 16 | 1, 0, 0, 0, 0, 1, 1, 0, 0, 0 | 3 | 30 | |
| 17 | 0, 1, 1, 0, 0, 0, 1, 0, 0, 0 | 3 | 30 | |
| 18 | 0, 1, 0, 0, 0, 0, 1, 1, 0, 0 | 3 | 30 | |

TABLE 5-continued

20 MHz Bandwidth and 10-Interlace Structure

| Pattern index | Resource allocation pattern for one UE | Number of allocated interlaces for one UE | Number of allocated PRBs for one UE | Note |
|---|---|---|---|---|
| 19 | 0, 0, 1, 1, 0, 0, 0, 1, 0, 0 | 3 | 30 | |
| 20 | 0, 0, 1, 0, 0, 0, 0, 1, 1, 0 | 3 | 30 | |
| 21 | 0, 0, 0, 1, 1, 0, 0, 0, 1, 0 | 3 | 30 | |
| 22 | 0, 0, 0, 1, 0, 0, 0, 0, 1, 1 | 3 | 30 | |
| 23 | 1, 1, 0, 0, 0, 1, 1, 0, 0, 0 | 4 | 40 | |
| 24 | 0, 1, 1, 0, 0, 0, 1, 1, 0, 0 | 4 | 40 | |
| 25 | 0, 0, 1, 1, 0, 0, 0, 1, 1, 0 | 4 | 40 | |
| 26 | 0, 0, 0, 1, 1, 0, 0, 0, 1, 1 | 4 | 40 | |
| 27 | 1, 1, 1, 0, 0, 1, 1, 0, 0, 0 | 5 | 50 | |
| 28 | 1, 1, 0, 0, 0, 1, 1, 1, 0, 0 | 5 | 50 | |
| 29 | 1, 1, 0, 0, 1, 1, 1, 0, 0, 0 | 5 | 50 | |
| 30 | 1, 1, 0, 0, 0, 1, 1, 0, 0, 1 | 5 | 50 | |
| 31 | 1, 0, 0, 1, 1, 1, 0, 0, 0, 1 | 5 | 50 | |
| 32 | 1, 0, 0, 0, 1, 1, 0, 0, 1, 1 | 5 | 50 | |
| 33 | 0, 1, 1, 1, 0, 0, 1, 1, 0, 0 | 5 | 50 | |
| 34 | 0, 1, 1, 0, 0, 0, 1, 1, 1, o | 5 | 50 | |
| 35 | 0, 0, 1, 1, 1, 0, 0, 1, 1, 0 | 5 | 50 | |
| 36 | 0, 0, 1, 1, 1, 0, 0, 0, 1, 1 | 5 | 50 | |
| 37 | 0, 0, 1, 1, 0, 0, 0, 1, 1, 1 | 5 | 50 | |
| 38 | 0, 0, 0, 1, 1, 0, 0, 1, 1, 1 | 5 | 50 | |
| 39 | 0, 0, 1, 1, 1, 0, 0, 1, 1, 1 | 6 | 60 | |
| 40 | 1, 0, 0, 1, 1, 1, 0, 0, 1, 1 | 6 | 60 | |
| 41 | 1, 1, 0, 0, 1, 1, 1, 0, 0, 1 | 6 | 60 | |
| 42 | 1, 1, 1, 0, 0, 1, 1, 0, 0, 0 | 6 | 60 | |
| 43 | 0, 0, 1, 1, 1, 0, 1, 1, 1, 1 | 7 | 70 | |
| 44 | 0, 1, 1, 1, 1, 0, 0, 1, 1, 1 | 7 | 70 | |
| 45 | 1, 0, 0, 1, 1, 1, 0, 1, 1, 1 | 7 | 70 | |
| 46 | 1, 0, 1, 1, 1, 1, 0, 0, 1, 1 | 7 | 70 | |
| 47 | 1, 1, 0, 0, 1, 1, 1, 0, 1, 1 | 7 | 70 | |
| 48 | 1, 1, 0, 1, 1, 1, 1, 0, 0, 1 | 7 | 70 | |
| 49 | 1, 1, 1, 0, 0, 1, 1, 1, 0, 1 | 7 | 70 | |
| 50 | 1, 1, 1, 0, 1, 1, 1, 1, 0, 0 | 7 | 70 | |
| 51 | 0, 1, 1, 1, 1, 0, 1, 1, 1, 1 | 8 | 80 | |
| 52 | 1, 0, 1, 1, 1, 1, 0, 1, 1, 1 | 8 | 80 | |
| 53 | 1, 1, 0, 1, 1, 1, 1, 0, 1, 1 | 8 | 80 | |
| 54 | 1, 1, 1, 0, 1, 1, 1, 1, 0, 1 | 8 | 80 | |
| 55 | 1, 1, 1, 1, 0, 1, 1, 1, 1, 0 | 8 | 80 | |
| 56 | 0, 1, 1, 1, 1, 1, 1, 1, 1, 1 | 9 | 90 | |
| 57 | 1, 0, 1, 1, 1, 1, 1, 1, 1, 1 | 9 | 90 | |
| 58 | 1, 1, 0, 1, 1, 1, 1, 1, 1, 1 | 9 | 90 | |
| 59 | 1, 1, 1, 0, 1, 1, 1, 1, 1, 1 | 9 | 90 | |
| 60 | 1, 1, 1, 1, 0, 1, 1, 1, 1, 1 | 9 | 90 | |
| 61 | 1, 1, 1, 1, 1, 0, 1, 1, 1, 1 | 9 | 90 | |
| 62 | 1, 1, 1, 1, 1, 1, 0, 1, 1, 1 | 9 | 90 | |
| 63 | 1, 1, 1, 1, 1, 1, 1, 0, 1, 1 | 9 | 90 | |
| 64 | 1, 1, 1, 1, 1, 1, 1, 1, 0, 1 | 9 | 90 | |
| 65 | 1, 1, 1, 1, 1, 1, 1, 1, 1, 0 | 9 | 90 | |
| 66 | 1, 1, 1, 1, 1, 1, 1, 1, 1, 1 | 10 | 100 | All the PRBs are allocated. |

EXAMPLE 3

In another embodiment, a 10 MHz nominal bandwidth may be used. Due to the constraint of 80% nominal bandwidth, all the available 50 PRBs may be divided into 5 interlaces with each interlace including 10 PRBs, or 4 interlaces with each interlace including 12 PRBs. One embodiment of corresponding resource allocation patterns are shown in Tables 6 and 7 as examples, respectively. In certain embodiments, for a 5 MHz nominal bandwidth, all available 25 PRBs may be divided into 3 interlaces with each interlace including 8 PRBs, or 2 interlaces with each interlace including 12 PRBs. One embodiment of corresponding resource allocation patterns are shown in Tables 8 and 9 as examples, respectively. It should be noted that five bits may be used to indicate the allocation patterns in Table 6, four bits may be used to indicate the allocation patterns in Table 7, three bits may be used to indicate the allocation patterns in Table 8, and two bits may be used to indicate the allocation patterns in Table 9. Accordingly, less signaling overhead to indicate the allocation patterns may be used as compared to allocation patterns that use ten bits to indication allocation patterns. Moreover, in certain embodiments, orthogonal resource allocation patterns may be used to remote units 102 by multiplexing in one remote unit 102 subframe.

TABLE 6

10 MHz Bandwidth and 5-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0, 0 | 1 | 10 | |
| 1 | 0, 1, 0, 0, 0 | 1 | 10 | |
| 2 | 0, 0, 1, 0, 0 | 1 | 10 | |

TABLE 6-continued

10 MHz Bandwidth and 5-Interlace Structure

| Pattern index | Resource allocation pattern for one UE | Number of allocated interlaces for one UE | Number of allocated PRBs for one UE | Note |
|---|---|---|---|---|
| 3 | 0, 0, 0, 1, 0 | 1 | 10 | |
| 4 | 0, 0, 0, 0, 1 | 1 | 10 | |
| 5 | 1, 1, 0, 0, 0 | 2 | 20 | |
| 6 | 0, 1, 1, 0, 0 | 2 | 20 | |
| 7 | 0, 0, 1, 1, 0 | 2 | 20 | |
| 8 | 0, 0, 0, 1, 1 | 2 | 20 | |
| 9 | 1, 1, 1, 0, 0 | 3 | 30 | |
| 10 | 1, 1, 0, 0, 1 | 3 | 30 | |
| 11 | 1, 0, 0, 1, 1 | 3 | 30 | |
| 12 | 0, 0, 1, 1, 1 | 3 | 30 | |
| 13 | 1, 1, 1, 1, 0 | 4 | 40 | |
| 14 | 1, 1, 1, 0, 1 | 4 | 40 | |
| 15 | 1, 1, 0, 1, 1 | 4 | 40 | |
| 16 | 1, 0, 1, 1, 1 | 4 | 40 | |
| 17 | 0, 1, 1, 1, 1 | 4 | 40 | |
| 18 | 1, 1, 1, 1, 1 | 5 | 50 | |

TABLE 7

10 MHz Bandwidth and 4-Interlace Structure

| Pattern index | Resource allocation pattern for one UE | Number of allocated interlaces for one UE | Number of allocated PRBs for one UE | Note |
|---|---|---|---|---|
| 0 | 1, 0, 0, 0 | 1 | 12 | |
| 1 | 0, 1, 0, 0 | 1 | 12 | |
| 2 | 0, 0, 1, 0 | 1 | 12 | |
| 3 | 0, 0, 0, 1 | 1 | 12 | |
| 5 | 1, 1, 0, 0 | 2 | 24 | |
| 6 | 0, 1, 1, 0 | 2 | 24 | |
| 7 | 0, 0, 1, 1 | 2 | 24 | |
| 9 | 1, 1, 1, 0 | 3 | 36 | |
| 10 | 1, 1, 0, 1 | 3 | 36 | |
| 11 | 1, 0, 1, 1 | 3 | 36 | |
| 12 | 0, 1, 1, 1 | 3 | 36 | |
| 13 | 1, 1, 1, 1 | 4 | 50 | All PRBs are scheduled. |

TABLE 8

5 MHz Bandwidth and 3-Interlace Structure

| Pattern index | Resource allocation pattern for one UE | Number of allocated interlaces for one UE | Number of allocated PRBs for one UE | Note |
|---|---|---|---|---|
| 0 | 1, 0, 0 | 1 | 8 | |
| 1 | 0, 1, 0 | 1 | 8 | |
| 2 | 0, 0, 1 | 1 | 8 | |
| 3 | 1, 1, 0 | 2 | 16 | |
| 4 | 1, 0, 1 | 2 | 16 | |
| 5 | 0, 1, 1 | 2 | 16 | |
| 6 | 1, 1, 1 | 3 | 25 | All PRBs are scheduled. |

TABLE 9

5 MHz Bandwidth and 2-Interlace Structure

| Pattern index | Resource allocation pattern for one UE | Number of allocated interlaces for one UE | Number of allocated PRBs for one UE | Note |
|---|---|---|---|---|
| 0 | 1, 0 | 1 | 12 | |
| 1 | 0, 1 | 1 | 12 | |
| 2 | 1, 1 | 2 | 25 | All PRBs are scheduled. |

Figure 7:
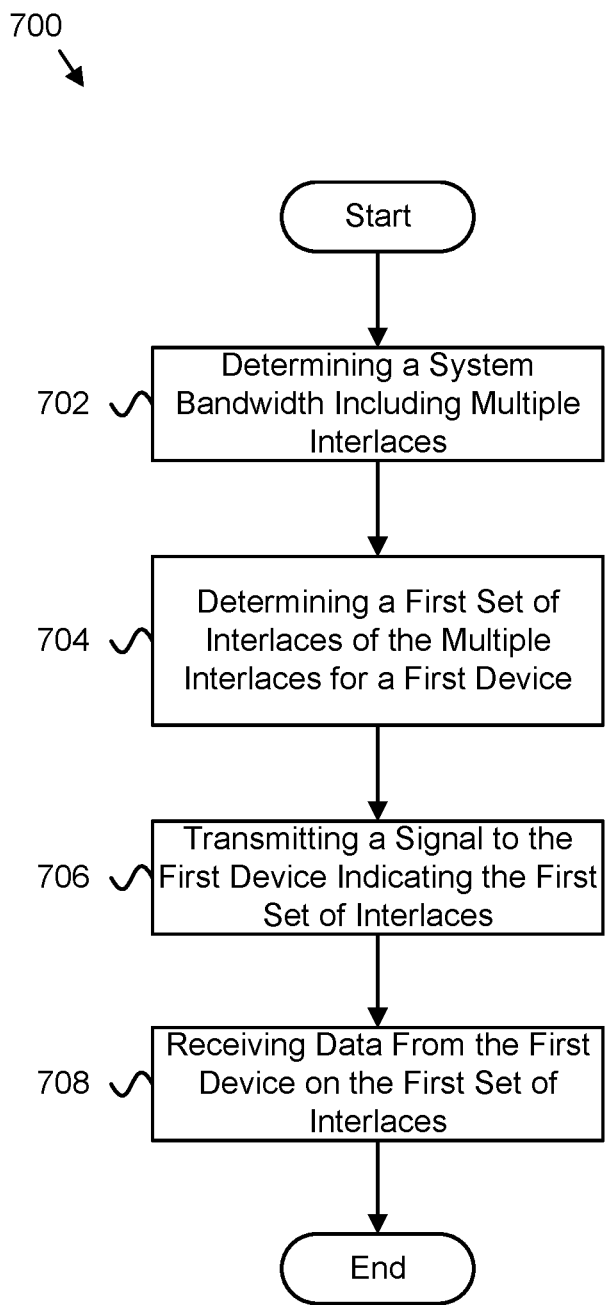
FIG. 7 is a schematic flow chart diagram illustrating one embodiment of a method for interlace determination.

FIG. 7 is a schematic flow chart diagram illustrating one embodiment of a method 700 for interlace determination. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include determining 702 a system bandwidth including multiple interlaces. Each interlace of the multiple interlaces may include a set of PRBs that are uniformly spaced in frequency, and each interlace of the multiple interlaces may have a frequency span that exceeds a predetermined percent of the system bandwidth. The method 700 may also include determining 704 a first set of interlaces of the multiple interlaces for a first device. The first set of interlaces may include one or more interlaces. The method 700 may include transmitting 706 a first signal to the first device. The first signal may indicate the first set of interlaces, and a number of bits of the first signal may be less than a number of interlaces of the multiple interlaces. The method 700 may include receiving 708 data from the first device on the first set of interlaces.

In certain embodiments, the method 700 may determine a second set of interlaces of the multiple interlaces for a second device. In such embodiments, the second set of interlaces may include one or more interlaces, the first and second sets of interlaces may be mutually exclusive, and the first and second sets of interlaces may include each interlace in the multiple interlaces; the method 700 may transmit a second signal to the second device, the second signal indicating the second set of interlaces; and the method 700 may receive data from the second device on the second set of interlaces. In some embodiments, the predetermined percent is 80 percent. In one embodiment, each interlace of the multiple interlaces includes a number of PRBs selected from the group including 8, 10, and 12. In various embodiments, the first set of interlaces includes at least two interlaces, and PRBs in the first set of interlaces are uniformly spaced in frequency. In some embodiments, the first set of interlaces includes at least two interlaces, and the at least two interlaces are consecutive in frequency. In certain embodiments, the first set of interlaces includes N interlaces, N is greater than one, the first set of interlaces includes a first subset of interlaces and a second subset of interlaces, the first subset of interlaces includes $$\left\lceil \frac{N}{2} \right\rceil$$

interlaces, the second subset of interlaces includes $$\left(\left\lceil \frac{N}{2} \right\rceil - 1\right)$$

interlaces, interlaces of the first subset of interlaces are consecutive in frequency, and interlaces of the second subset of interlaces are consecutive in frequency.

In some embodiments, the method 700 may transmit a third signal to the first device, and the third signal indicates one or more of the number of interlaces in the multiple interlaces and a number of PRBs in each interlace of the multiple interlaces. In certain embodiments, the method 700 may determine one or more PRBs not included in the multiple interlaces; the method 700 may transmit a fourth signal to the first device, wherein the fourth signal indicates whether the one or more PRBs are assigned for data transmission; and the method 700 may receive data from the first device on the one or more PRBs. In various embodiments, the method 700 may determine one or more PRBs not included in the multiple interlaces; and the method 700 may receive data from the first device on the one or more PRBs if the first set of interlaces includes a predetermined interlace. In some embodiments, the method 700 may determine one or more PRBs not included in the multiple interlaces; the method 700 may transmit a fifth signal to the first device, wherein the fifth signal indicates at least one PRB of the one or more PRBs for transmission of control information; and the method 700 may receive control information from the first device on the at least one PRB.

Figure 8:
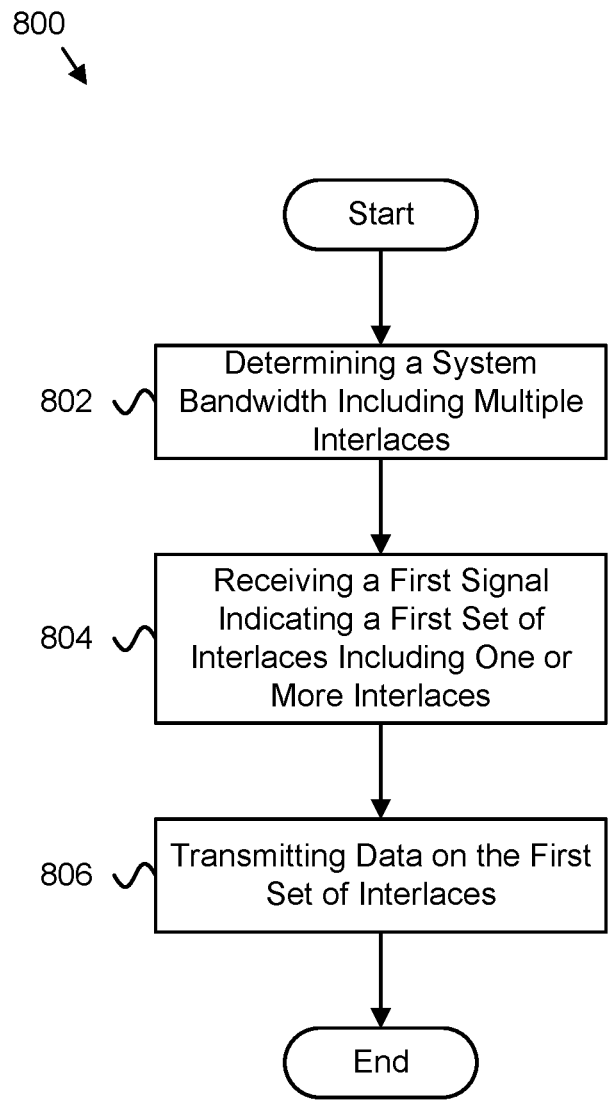
FIG. 8 is a schematic flow chart diagram illustrating another embodiment of a method for interlace determination.

FIG. 8 is a schematic flow chart diagram illustrating another embodiment of a method 800 for interlace determination. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include determining 802 a system bandwidth including multiple interlaces. Each interlace of the multiple interlaces may include a set of PRBs that are uniformly spaced in frequency, and each interlace of the multiple interlaces may have a frequency span that exceeds a predetermined percent of the system bandwidth. The method 800 may also include receiving 804 a first signal. The first signal may indicate a first set of interlaces including one or more interlaces, and a number of bits of the first signal may be less than a number of interlaces of the multiple interlaces. The method 800 may include transmitting 806 data on the first set of interlaces.

In some embodiments, the predetermined percent is 80 percent. In one embodiment, each interlace of the multiple interlaces includes a number of PRBs selected from the group including 8, 10, and 12. In various embodiments, the first set of interlaces includes at least two interlaces and PRBs in the first set of interlaces are uniformly spaced in frequency. In some embodiments, the first set of interlaces includes at least two interlaces and the at least two interlaces are consecutive in frequency. In certain embodiments, the first set of interlaces includes N interlaces, N is greater than one, the first set of interlaces includes a first subset of interlaces and a second subset of interlaces, the first subset of interlaces includes $$\left\lceil \frac{N}{2} \right\rceil$$

interlaces, the second subset of interlaces includes $$\left(\left\lceil \frac{N}{2} \right\rceil - 1\right)$$

interlaces, interlaces of the first subset of interlaces are consecutive in frequency, and interlaces of the second subset of interlaces are consecutive in frequency.

In some embodiments, the method 800 may receive a second signal indicating one or more of the number of interlaces in the multiple interlaces and a number of PRBs in each interlace of the multiple interlaces. In certain embodiments, the method 800 may determine one or more PRBs not included in the multiple interlaces; the method 800 may receive a fourth signal indicating whether the one or more PRBs are assigned for data transmission; and the method 800 may transmit data on the one or more PRBs. In various embodiments, the method 800 may determine one or more PRBs not included in the multiple interlaces; and the method 800 may transmit data on the one or more PRBs if the first set of interlaces includes a predetermined interlace. In some embodiments, the method 800 may determine one or more PRBs not included in the multiple interlaces; the method 800 may receive a fifth signal indicating at least one PRB of the one or more PRBs for transmission of control information; and the method 800 may transmit control information on the at least one PRB. In one embodiment, the method 800 may determine a number of PRBs, denoted as Q, in the first set of interlaces; and the method 800 may exclude M PRBs in the first set of interlaces for data transmission, wherein M is a minimum non-negative integer value in which Q-M is not divisible by an integer other than 2, 3, or 5.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
  receiving an uplink grant scheduling uplink data transmission, wherein the uplink grant indicates a resource pattern index for the uplink data transmission, the resource pattern index is associated with a resource allocation pattern comprising one or more physical resource block ("PRB") sets from a plurality of PRB sets, and each PRB set of the plurality of PRB sets comprises PRBs that are uniformly spaced within a system bandwidth; and
  transmitting uplink data on the one or more PRB sets.

2. The method of claim 1, wherein a number of bits of used to indicate the resource pattern index is less than a total number of the plurality of PRB sets.

3. The method of claim 1, wherein the resource pattern index is associated with the resource allocation pattern in a predefined resource allocation table.

4. The method of claim 1, wherein each PRB set has a frequency span that exceeds a predetermined percent of the system bandwidth.

5. The method of claim 4, wherein the predetermined percent is 80 percent.

6. The method of claim 1, wherein each PRB set comprises a number of PRBs selected from the group consisting of 8, 10, and 12.

7. The method of claim 1, wherein the resource allocation pattern comprises at least two PRB sets.

8. The method of claim 1, wherein the resource allocation pattern comprises at least two PRB sets and the at least two PRB sets are consecutive in frequency.

9. The method of claim 1, wherein the resource allocation pattern comprises N PRB sets, N is an even-number and greater than one, the N PRB sets comprises a first subset of PRB sets and a second subset of PRB sets, the first subset of PRB sets comprises $$\frac{N}{2}$$

sets and the second subset of PRB sets comprises $$\frac{N}{2}$$

PRB sets, PRB sets in the first subset of PRB sets are consecutive in frequency, and PRB sets in the second subset of PRB sets are consecutive in frequency.

10. The method of claim 1, further comprising receiving a signal indicating a signaled one or more PRB sets of the plurality of PRB sets and a number of PRBs in each PRB set of the signaled one or more PRB sets.

11. The method of claim 1, further comprising:
determining one or more PRBs not included in the plurality of PRB sets;
receiving a signal indicating whether the one or more PRBs are assigned for data transmission; and
transmitting data on the one or more PRBs.

12. The method of claim 1, further comprising:
determining one or more PRBs not included in the plurality of PRB sets; and
transmitting data on the one or more PRBs if the one or more PRB sets includes a predetermined PRB set.

13. The method of claim 1, further comprising:
determining one or more PRBs not included in the plurality of PRB sets;
receiving a signal indicating at least one PRB of the one or more PRBs for transmission of control information; and
transmitting control information on the at least one PRB.

14. The method of claim 1, further comprising:
determining a number of PRBs, denoted as Q, in the one or more PRB sets; and
excluding M PRBs in the one or more PRB sets for data transmission, wherein M is a minimum non-negative integer value in which Q-M is not divisible by an integer other than 2, 3, or 5.

15. An apparatus comprising:
a receiver that receives an uplink grant scheduling uplink data transmission, wherein the uplink grant indicates a resource pattern index for the uplink data transmission, the resource pattern index is associated with a resource allocation pattern comprising one or more physical resource block ("PRB") sets from a plurality of PRB sets, and each PRB set of the plurality of PRB sets comprises PRBs that are uniformly spaced within a system bandwidth; and
a transmitter that transmits uplink data on the one or more PRB sets.

16. The apparatus of claim 15, wherein a number of bits of used to indicate the resource pattern index is less than a total number of the plurality of PRB sets.

17. The apparatus of claim 15, wherein the resource pattern index is associated with the resource allocation pattern in a predefined resource allocation table.

18. The apparatus of claim 15, wherein each PRB set has a frequency span that exceeds a predetermined percent of the system bandwidth.

19. The apparatus of claim 18, wherein the predetermined percent is 80 percent.

20. The apparatus of claim 15, wherein each PRB set comprises a number of PRBs selected from the group consisting of 8, 10, and 12.

21. The apparatus of claim 15, wherein the resource allocation pattern comprises at least two PRB sets.

22. The apparatus of claim 15, wherein the resource allocation pattern comprises at least two PRB sets and the at least two PRB sets are consecutive in frequency.

23. The apparatus of claim 15, wherein the resource allocation pattern comprises N PRB sets, N is an even-number and greater than one, the N PRB sets comprises a first subset of PRB sets and a second subset of PRB sets, the first subset of PRB sets comprises $$\frac{N}{2}$$

PRB sets and the second subset of PRB sets comprises $$\frac{N}{2}$$

PRB sets, PRB sets in the first subset of PRB sets are consecutive in frequency, and PRB sets in the second subset of PRB sets are consecutive in frequency.

24. The apparatus of claim 15, wherein the receiver receives a signal indicating a signaled one or more PRB sets of the plurality of PRB sets and a number of PRBs in each PRB set of the signaled one or more PRB sets.

25. The apparatus of claim 15, further comprising a processor, wherein:
the processor determines one or more PRBs not included in the plurality of PRB sets;
the receiver receives a signal indicating whether the one or more PRBs are assigned for data transmission; and
the transmitter transmits data on the one or more PRBs.

26. The apparatus of claim 15, further comprising a processor, wherein:
the processor determines one or more PRBs not included in the plurality of PRB sets; and
the transmitter transmits data on the one or more PRBs if the one or more PRB sets includes a predetermined PRB set.

27. The apparatus of claim 15, further comprising a processor, wherein:
the processor determines one or more PRBs not included in the plurality of PRB sets;

the receiver receives a signal indicating at least one PRB of the one or more PRBs for transmission of control information; and the transmitter transmits control information on the at least one PRB.

28. The apparatus of claim 15, further comprising a processor, wherein:

the processor:
determines a number of PRBs, denoted as Q, in the one or more PRB sets; and
excludes M PRBs in the one or more PRB sets for data transmission, wherein M is a minimum non-negative integer value in which Q-M is not divisible by an integer other than 2, 3, or 5.

29. A method comprising:
transmitting an uplink grant scheduling uplink data transmission, wherein the uplink grant indicates a resource pattern index for the uplink data transmission, the resource pattern index is associated with a resource allocation pattern comprising one or more physical resource block ("PRB") sets from a plurality of PRB sets, and each PRB set of the plurality of PRB sets comprises PRBs that are uniformly spaced within a system bandwidth; and receiving uplink data on the one or more PRB sets.

30. The method of claim 29, wherein a number of bits of used to indicate the resource pattern index is less than a total number of the plurality of PRB sets.

31. The method of claim 29, wherein the resource pattern index is associated with the resource allocation pattern in a predefined resource allocation table.

32. The method of claim 29, wherein each PRB set has a frequency span that exceeds a predetermined percent of the system bandwidth.

33. The method of claim 32, wherein the predetermined percent is 80 percent.

34. The method of claim 29, wherein each PRB set comprises a number of PRBs selected from the group consisting of 8, 10, and 12.

35. The method of claim 29, wherein the resource allocation pattern comprises at least two PRB sets.

36. The method of claim 29, wherein the resource allocation pattern comprises at least two PRB sets and the at least two PRB sets are consecutive in frequency.

37. The method of claim 29, wherein the resource allocation pattern comprises N PRB sets, N is an even-number and greater than one, the N PRB sets comprises a first subset of PRB sets and a second subset of PRB sets, the first subset of PRB sets comprises $$\frac{N}{2}$$

PRB sets and the second subset of PRB sets comprises $$\frac{N}{2}$$

PRB sets, PRB sets in the first subset of PRB sets are consecutive in frequency, and PRB sets in the second subset of PRB sets are consecutive in frequency.

38. The method of claim 29, further comprising transmitting a signal indicating a signaled one or more PRB sets of the plurality of PRB sets and a number of PRBs in each PRB set of the signaled one or more PRB sets.

39. The method of claim 29, further comprising:
determining one or more PRBs not included in the plurality of PRB sets;
transmitting a signal indicating whether the one or more PRBs are assigned for data receiving; and
receiving data on the one or more PRBs.

40. The method of claim 29, further comprising:
determining one or more PRBs not included in the plurality of PRB sets; and
receiving data on the one or more PRBs if the one or more PRB sets includes a predetermined PRB set.

41. The method of claim 29, further comprising:
determining one or more PRBs not included in the plurality of PRB sets;
transmitting a signal indicating at least one PRB of the one or more PRBs for receiving of control information; and
receiving control information on the at least one PRB.

42. The method of claim 29, further comprising:
determining a number of PRBs, denoted as Q, in the one or more PRB sets; and
excluding M PRBs in the one or more PRB sets for data receiving, wherein M is a minimum non-negative integer value in which Q-M is not divisible by an integer other than 2, 3, or 5.

* * * * *